US008342723B2

(12) United States Patent
Mochizuki (10) Patent No.: US 8,342,723 B2
(45) Date of Patent: Jan. 1, 2013

(54) HEADLAMP HAVING SELECTABLE BEAM

(75) Inventor: Kazuhisa Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 824 days.

(21) Appl. No.: 12/036,315

(22) Filed: Feb. 25, 2008

(65) Prior Publication Data

US 2008/0225535 A1 Sep. 18, 2008

(30) Foreign Application Priority Data

Mar. 15, 2007 (JP) ................................ 2007-067521

(51) Int. Cl.
*B60Q 1/00* (2006.01)
*F21V 33/00* (2006.01)

(52) U.S. Cl. ........ 362/464; 362/465; 362/466; 362/473; 362/475

(58) Field of Classification Search .......... 362/464–466, 362/473, 475
See application file for complete search history.

(56) References Cited

U.S. PATENT DOCUMENTS 7,040,791 B2 * 5/2006 Nakamura et al. ............ 362/544
2005/0099818 A1 * 5/2005 Gropp et al. ................. 362/466
2005/0180158 A1 * 8/2005 Komatsu ....................... 362/545

FOREIGN PATENT DOCUMENTS

| CN | 1152796 C | 6/2004 |
| CN | 1613687 A | 5/2005 |
| JP | 57-44542 A | 3/1982 |
| JP | 1-127466 A | 5/1989 |
| JP | 8-25417 B2 | 3/1996 |
| JP | 2004-534683 A | 11/2004 |

OTHER PUBLICATIONS

Chinese Office Action dated Sep. 11, 2009.
Japanese Office Action dated Mar. 8, 2011 issued in counterpart Japanese Appl. No. 2007-067521.

* cited by examiner

*Primary Examiner* — Diane Lee
*Assistant Examiner* — Sean Gramling
(74) *Attorney, Agent, or Firm* — Sughrue Mion, PLLC (57) ABSTRACT

A headlamp having a selectable beam is provided. The headlamp having the selectable beam is configured such that a low beam and a high beam are selectable, and the headlamp includes a first lamp section which forms a low-beam light distribution pattern if the low beam is selected; a second lamp section which forms a high-beam light distribution pattern if the high beam is selected; and a control unit which controls the second lamp section based on an inclination angle of a body on which the headlamp is mounted.

14 Claims, 8 Drawing Sheets

FIG. 8B

HEADLAMP HAVING SELECTABLE BEAM

FIELD OF THE INVENTION

Apparatuses consistent with the present invention relates to a headlamp, and more particularly, to a headlamp which is configured such that a low bean and a high beam are selectable.

DESCRIPTION OF THE RELATED ART

Related art headlamps for four-wheel vehicles, such as automobiles and the like, are often configured such that a low beam and a high beam are selectable. The selectable low and high beams allow a broader range of visibility as road conditions and environmental conditions change.

In the case of the four-wheeled vehicle, when the four-wheeled vehicle turns, the headlamps follow the turn and irradiate the road in front of the four-wheeled vehicle as the vehicle executes the turn in a similar fashion to when the four-wheeled vehicle is traveling straight. Thus, the headlamps provide sufficient irradiation even when the four-wheeled vehicle is executing a turn.

However, there are situations in which a headlamp is provided on a body that is capable of inclining during a turn. For example, a headlamp may be provided on a body such as a two-wheeled vehicle, e.g., a motorcycle, which, during execution of a turn, incline with respect to a surface on which the body is traveling. In these cases, when a low beam is selected while the body is traveling straight, a low-beam light distribution pattern is formed to ensure a forward visibility for a rider without giving a glare to a driver of an oncoming vehicle. However, when the body is turning rightward or leftward with the low beam being selected, the body is inclined, whereby the low-beam light distribution pattern is inclined in accordance with an inclination of the body. In such a case, a traveling surface ahead of the body in a cornering direction is not irradiated sufficiently.

In order to address the above problem, JP 8-25417 B2 proposes to incline a lamp body of the headlamp toward a opposite direction to an inclining direction of a body of a two-wheel vehicle, thereby preventing the low-beam light distribution pattern from being inclined. According to this configuration, it is possible to sufficiently irradiate a road surface ahead of the two-wheel vehicle even when cornering.

However, the proposed solution of JP 8-25417 B2 is complicated and expensive in that it is necessary to provide a mechanism for inclining the lamp body in the opposite direction to the inclining direction of the body of the two-wheel vehicle. Additionally, this mechanism is mechanical in nature and is therefore subject to mechanical breakdown.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

An aspect of the present invention is to provide a headlamp in which a low beam and a high beam are selectable, and even when a body on which the headlamp is provided is inclined due to a cornering operation with the low beam being selected, a traveling surface ahead of the body in a cornering direction can be sufficiently irradiated while maintaining a simple, uncomplicated configuration of the headlamp.

According to an aspect of the present invention, a headlamp is provided. The headlamp is configured such that a low beam and a high beam are selectable. The headlamp comprises a first lamp section which forms a low-beam light distribution pattern if the low beam is selected; a second lamp section which forms a high-beam light distribution pattern if the high beam is selected; and a control unit which turns on the second lamp section at a reduced light volume if the inclination angle of the body is equal to or greater than a threshold angle while the low beam is selected.

According to another aspect of the present invention, a headlamp for a two wheeled vehicle is provided. The headlamp is configured such that a low beam and a high beam are selectable, and the headlamp comprises a low-beam lamp section which forms a low-beam light distribution pattern if the low beam is selected; a high-beam lamp section which forms a high-beam light distribution pattern if the high beam is selected, the high-beam lamp section comprising a converging lamp unit which forms a converged light distribution pattern; and a diffusing lamp unit which forms a diffused light distribution pattern. The headlamp further comprises a sensor which detects an inclination angle at which the two wheeled vehicle is inclined and, if the inclination angle is equal to or greater than the threshold angle, outputs a detection signal; and a control unit which, if the sensor outputs a detection signal while the low beam is selected, turns on the high-beam lamp section at a reduced light volume by turning on the diffusing lamp unit without turning on the converging lamp unit.

DESCRIPTION OF EXEMPLARY EMBODIMENTS OF THE PRESENT INVENTION

Hereinafter, exemplary embodiments of the present invention will be described with reference to the drawings. The following exemplary embodiments do not limit the scope of the invention. While exemplary embodiments are described with respect to a two-wheeled vehicle, such as a motorcycle, the present inventive concept is broader, and is applicable to any headlamp which may be used with a body which inclines.

First Exemplary Embodiment

Figure 1:
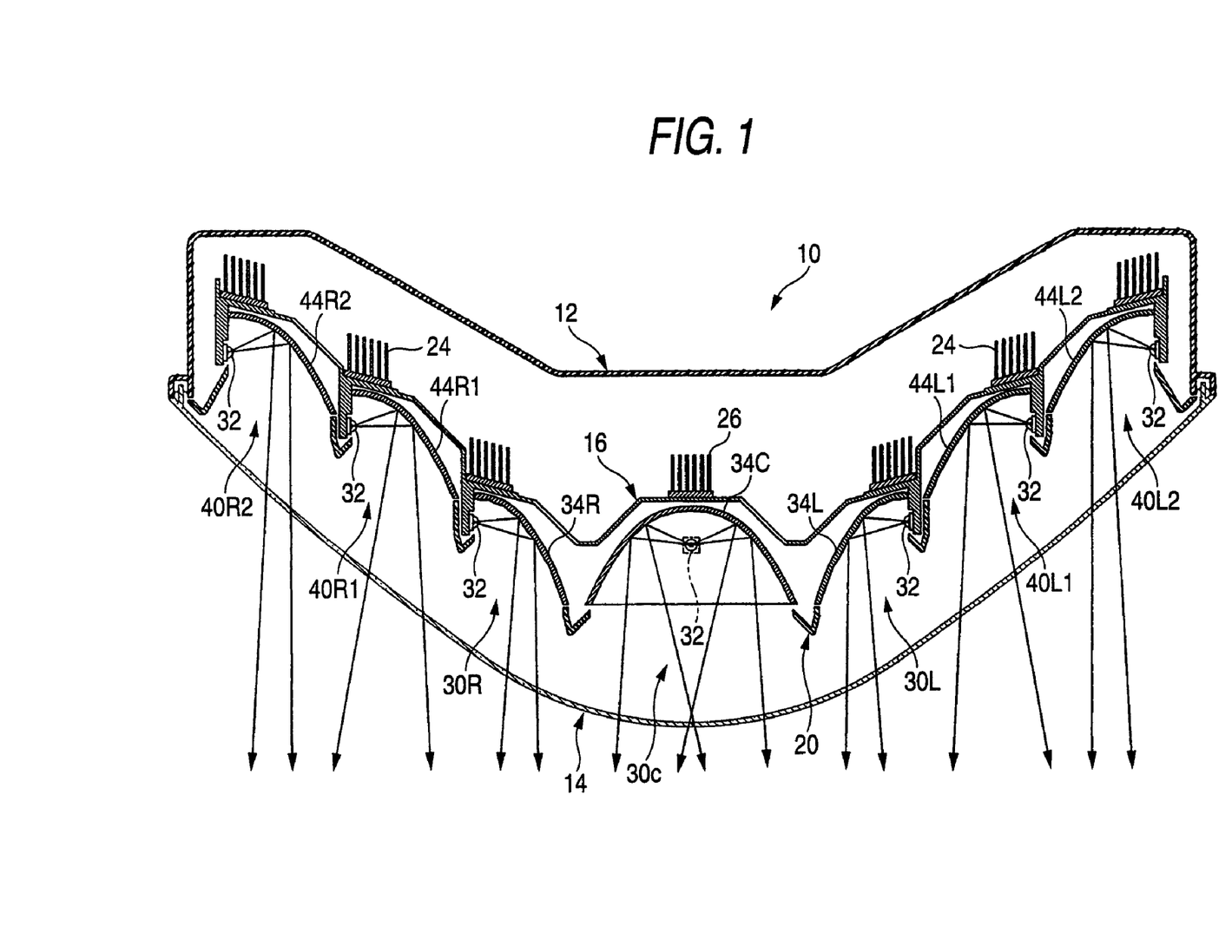
FIG. 1 is a sectional plan view of a headlamp according to a first exemplary embodiment of the present invention.

FIG. 1 is a sectional plan view of a headlamp 10 according to a first exemplary embodiment of the invention. The headlamp 10 according to the first exemplary embodiment is adapted to be used in a two-wheel vehicle such as a motorcycle.

As shown in FIG. 1, the headlamp 10 includes a lamp body 12 having an opening portion at an front end portion thereof, a transparent cover 14 attached to the opening portion of the lamp body to form a lamp chamber, a first lamp section having three lamp units 30C, 30L, 30R, and a second lamp section having four lamp units 40L1, 40R1, 40L2, 40R. The transparent cover 14 does not substantially deflect light transmitting therethrough. The first lamp section and the second lamp section are accommodated inside the lamp chamber such that the lamp units 30C, 30L, 30R, 40L1, 40R1, 40L2, 40R are disposed along a width direction of the two-wheel vehicle.

The headlamp 10 has a bilaterally symmetric configuration. A central portion of the transparent cover 14 in the width direction is protruded toward a front side of the two-wheel vehicle when seen from above as shown in FIG. 1. The lamp unit 30C is disposed at a center in the width direction, and the lamp units 30L, 30R are disposed on respective sides of the lamp unit 30C. The lamp units 40L1, 40R1 are disposed obliquely rear to the lamp units 30L, 30R respectively, and the lamp units 40L2, 40R2 are disposed obliquely rear to the lamp units 40L1, 40R1 respectively.

The headlamp 10 further includes a metallic bracket 16 on which the lamp units 30C, 30L, 30R, 40L1, 40R1, 40L2, 40R2 are fixedly supported. The metallic bracket 16 is supported by the lamp body 12 inside the lamp chamber, and extends in the width direction of the two-wheel vehicle substantially in a V-shape.

The headlamp 10 further includes an extension member 20 surrounding each of the lamp units 30C, 30L, 30R, 40L1, 40R1, 40L2, 40R2 on a front side thereof.

The lamp unit 30C includes a light emitting element 32 oriented downward, and a reflector 34C disposed below the light emitting element 32. The reflector 34C reflects light from the light emitting element 32 in a forward direction.

Each of the lamp units 30L, 30R, 40L1, 40R1, 40L2, 40R2 includes a light emitting element 32 oriented inward in the width direction of the two-wheel vehicle, and each of the lamp units 30L, 30R, 40L1, 40R1, 40L2, 40R2 includes a reflector 34L, 34R, 44L1, 44R1, 44L2, 44R2, respectively, disposed on an inner side of the corresponding light emitting element 32 in the width direction. The reflectors 34L, 34R, 44L1, 44R1, 44L2, 44R2 reflect light from the corresponding one of the light emitting elements 32 in the forward direction.

The metallic bracket 16 is formed in a stepped shape when seen from above as shown in FIG. 1. The metallic bracket 16 includes three vertical wall portions, each protruding in the forward direction from a front side thereof. Each of the vertical wall portions includes recess portions formed on wall surfaces thereof facing the inner side in the width direction of the two-wheel vehicle. Each of the light emitting elements 32 of the lamp units 30L, 30R, 40L1, 40R1, 40L2, 40R2 are fixedly supported inside the corresponding one of the recess portions of the vertical wall portions. The light emitting element 32 of the lamp unit 30C is fixedly supported on an upper wall (not shown) of the metallic bracket 16.

The headlamp 10 further includes heat sinks 24 fixedly joined to rear surface of portions of the metallic bracket 16, which are extended from the inner side to an outer side in the width direction of the two-wheel vehicle on rear sides of the respective lamp units 30L, 30R, 40L1, 40R1, 40L2, 40R2 and are inclined toward a rear side of the two-wheel vehicle. The headlamp 10 further includes a heat sink 26 fixedly joined to a rear surface of a portion of the metallic bracket 16 on a rear side of the lamp unit 30C.

The light emitting elements 32 of the lamp units 30C, 30L, 30R, 40L1, 40R1, 40R2, 40R1 comprise white light emitting diodes, and they each have a similar configuration. Light emitting elements 32 other than white light emitting diodes may also be used as long as they provide adequate light for lighting a path of the vehicle.

Each of the reflectors 34C, 34L, 34R, 44L1, 44R1, 44L2, 44R2 of the respective lamp units 30C, 30L, 30R, 40L1, 40R1, 40L2, 40R2 is formed to conform with a paraboloid of revolution. The paraboloid of revolution, serving as a reference surface, has a center axis extending in a front-and-rear direction of the two-wheel vehicle and passing through a light emitting center of the corresponding one of the light emitting elements 32, and a focal point at the light emitting center of the corresponding one of the light emitting elements 32. Each of the reflectors 34C, 34L, 34R, 44L1, 44R1, 44L2, 44R2 reflects the light from the corresponding one of the light emitting elements 32 such that the reflected light diffuses and deflects in a horizontal direction.

A reflecting surface of the reflector 34C downwardly reflects the light from the corresponding light emitting element 32 such that the light is evenly diffused in right and left directions with a relatively large diffusion angle compared with the reflectors 34L, 34R. A reflecting surface of the reflector 34L reflects the light from the corresponding light emitting element 32 slightly downward and toward the left direction with a relatively small diffusion angle compared with the reflector 34C. A reflecting surface of the reflector 34R reflects the light from the corresponding light emitting element 32 slightly downward and toward the right direction with a s relatively small diffusion angle compared with the reflector 34C.

A reflecting surface of the reflector 44L1 reflects the light from the corresponding light emitting element 32 in the leftward direction with a relatively large diffusion angle compared with the reflector 34L, and a reflecting surface of the reflector 44R1 reflects the light from the corresponding light emitting element 32 in the rightward direction with a relatively large diffusion angle compared with the reflector 34R.

A reflecting surface of the reflector 44L2 reflects the light from the corresponding light emitting element 32 toward the left direction with a relatively small diffusion angle compared with the reflector 44L1, and a reflecting surface of the reflector 44R2 reflects the light from the corresponding light emitting element 32 in the rightward direction with a relatively small diffusion angle compared with the reflector 44R1.

The headlamp 10 is configured such that a low beam and a high beam are selectable. If the low beam is selected, only the lamp units 30C, 30L, 30R of the first lamp section are turned on to form a low-beam light distribution pattern. If the high beam is selected, only the lamp units 40L1, 40R1, 40L2, 40R2 of the second lamp section are illuminated to form a high-beam light distribution pattern.

Figure 3A:
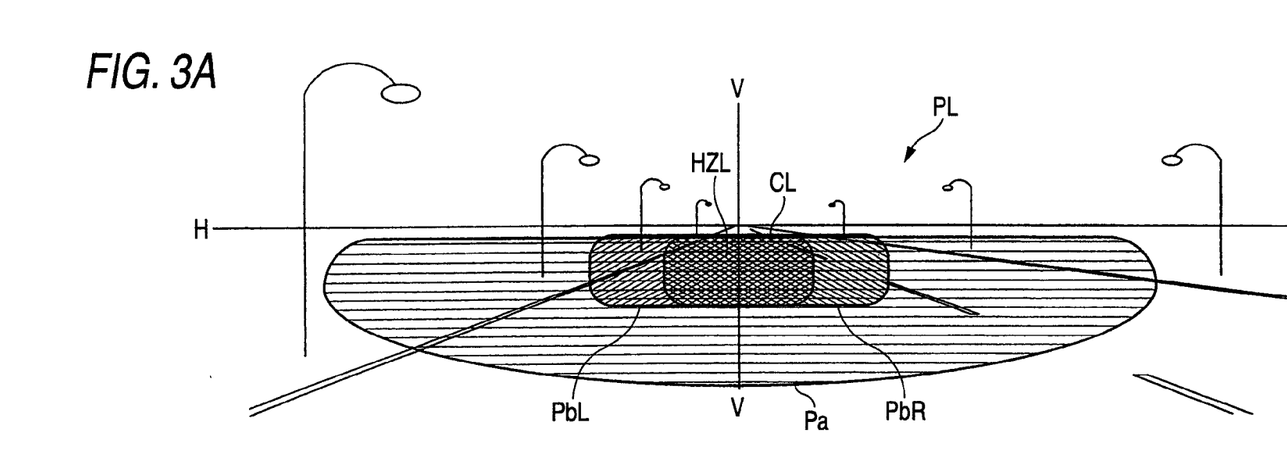
FIGS. 3A and 3B are perspective views showing a low-beam light distribution pattern and a high-beam distribution pattern, respectively, of the headlamp according to the first exemplary embodiment, the light distribution patterns being formed on an imaginary vertical screen disposed at a position 25m in front of the headlamp.
Figure 3B:
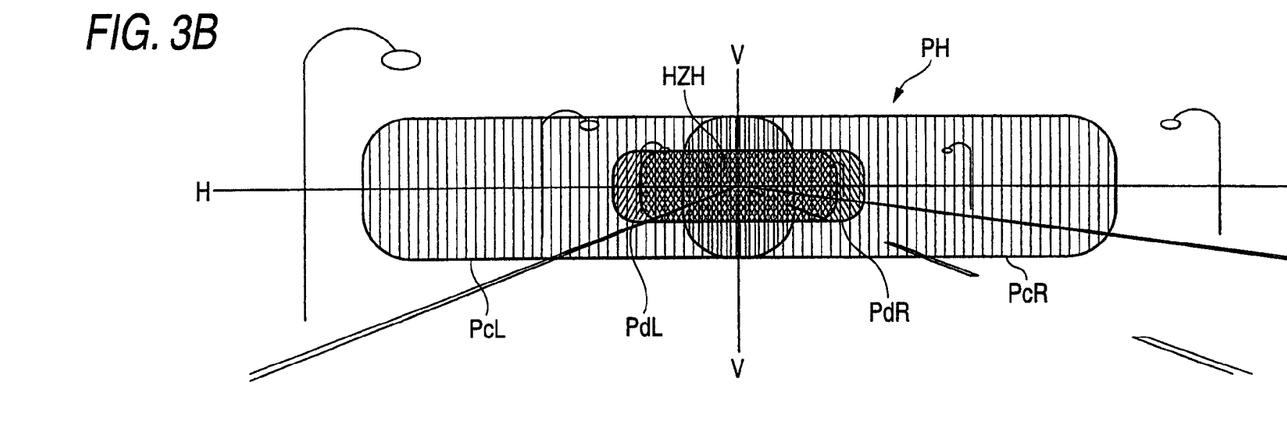

FIG. 3A is a perspective view showing the low-beam light distribution pattern PL formed on an imaginary vertical screen disposed at a position 25m in front of the headlamp 10, and FIG. 3B is a perspective view showing the high-beam light distribution pattern PH formed on the imaginary vertical screen.

As shown in FIG. 3A, the low-beam light distribution pattern PL has a bilaterally symmetrical shape with respect to a line V-V passing through a point H-V, which is a vanishing point in the forward direction of the headlamp 10. The low-beam light distribution pattern PL has a horizontal cut-off line CL at an upper edge portion thereof. The horizontal cut-off line CL is formed slightly below a line H-H, which is a horizontal line passing through the point H-V. The low-beam light distribution pattern has a hot zone HZL, which is a high luminosity area, formed along the horizontal cut-off line CL around the line V-V.

The low beam pattern PL is formed by a combining three light distribution patterns Pa, PbL, PbR.

The light distribution pattern Pa is formed by the light irradiated from the lamp unit 30C. The light distribution pattern Pa has a relatively wide vertical width and a relatively large horizontal diffusion angle compared with the light distribution patterns PbL, PbR, and is formed as a diffused light distribution pattern, which is evenly diffused in the right and left directions on respective sides of the line V-V and below the horizontal cut-off line CL.

The light distribution pattern PbL is formed by the light irradiated from the lamp unit 30L, and the light distribution pattern PbR is formed by the light irradiated from the lamp unit 30R. The horizontal cut-off line CL is formed by upper edges of the light distribution patterns PbL, PbR. Each of the light distribution patterns PbL, PbR has a relatively narrow vertical width and a relatively small horizontal diffusion angle compared with the light distribution pattern Pa. A center of each of the light distribution patterns PbL, PbR is shifted in the horizontal direction from the line V-V in the opposite direction such that the light distribution patterns PbL, PbR partially overlap each other.

As shown in FIG. 3B, the high-beam light distribution pattern PH extends in the horizontal direction from the point H-V, and includes a hot zone HZH, which is a high luminosity area, formed around the point H-V.

The high-beam light distribution pattern PH is formed by combining two diffused light distribution patterns PcL, PcR and two converged light distribution patterns PdL, PdR.

The diffused light distribution pattern PcL is formed by the light irradiated from the lamp unit 40L1, and the diffused light distribution pattern PcR is formed by the light irradiated from the lamp unit 40R1. The diffused light distribution pattern PcL has a relatively wide vertical width and a relatively large horizontal diffusion angle compared with the converged light distribution patterns PdL, PdR, and extends in the horizontal direction over the line V-V with a center thereof being shifted in the leftward direction from the line V-V. A right edge of the diffused light distribution pattern PcL is formed in the vicinity of the line V-V. The light distribution patter PcR is formed bilaterally symmetrical to the light distribution pattern PcL with respect to the line V-V.

The converged light distribution pattern PdL is formed by the light irradiated from the lamp unit 40L2, and the converged light distribution pattern PdR is formed by the light irradiated from the lamp unit 40R. The converged light distribution pattern PdL has a relatively narrow vertical width and a relatively small horizontal diffusion angle compared with the diffused light distribution patterns PcL, PcR, and extends in the horizontal direction over the line V-V with a center thereof being shifted slightly in the leftward direction from the line V-V. The light distribution patter PdR is formed bilaterally symmetrical to the light distribution pattern PdL with respect to the line V-V.

As described above, the headlamp 10 is configured such that the first lamp section is turned on if the two-wheel vehicle equipped with the headlamp 10 is traveling straight with the low beam being selected. However, when a body (not shown) of the two-wheel vehicle is inclined leftward or rightward at a certain angle or more, for example in accordance with a cornering operation of the two-wheel vehicle, the second lamp section is additionally turned on with light volume thereof being reduced.

Figure 2:
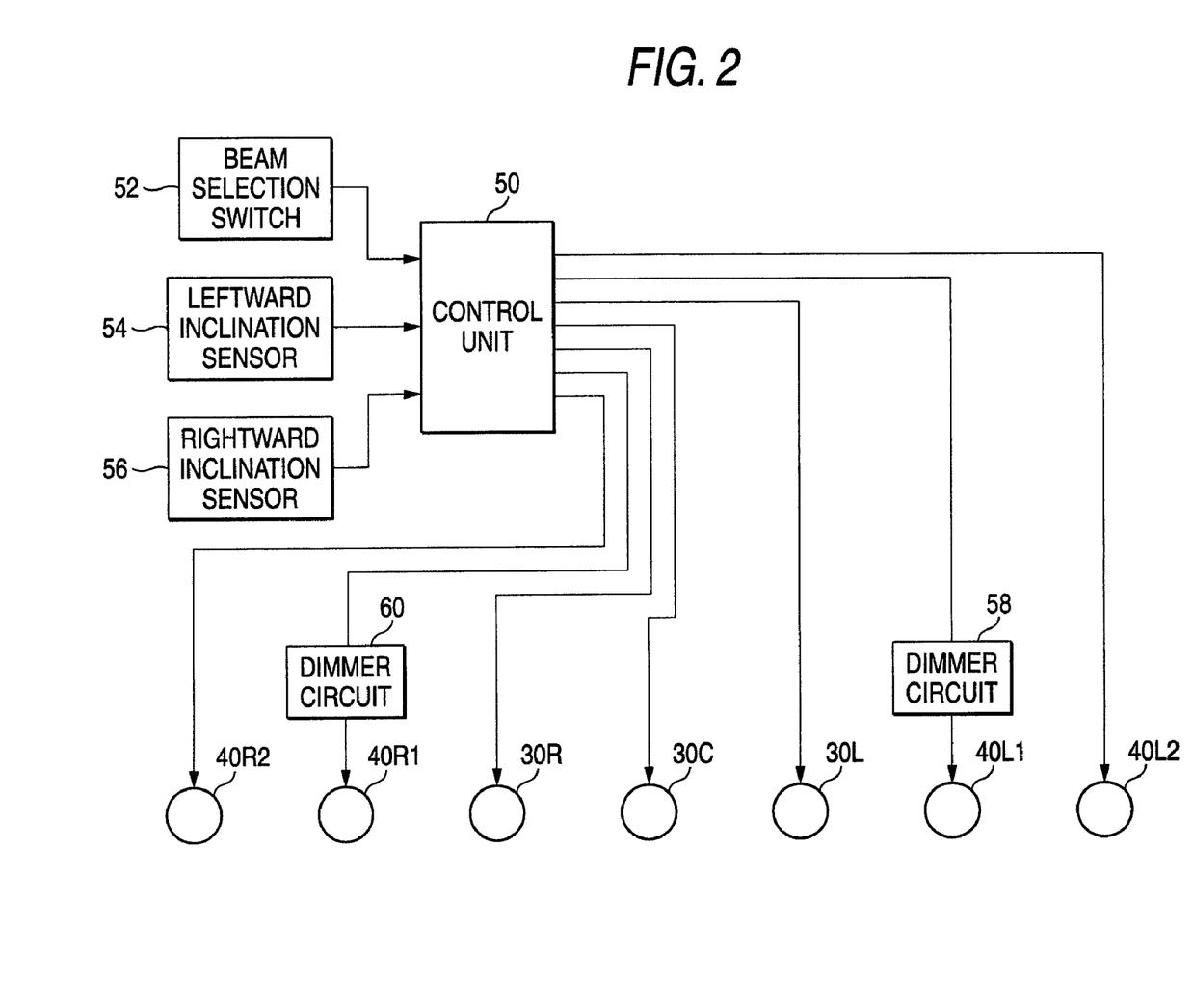
FIG. 2 is a block diagram showing a configuration for implementing a light-volume-reduced additional lighting in the headlamp of FIG. 1.

FIG. 2 is a block diagram showing a configuration for implementing such a light-volume-reduced additional lighting.

As shown in FIG. 2, the headlamp 10 according to the first exemplary embodiment further includes a beam selection switch 52, a leftward inclination sensor 54, a rightward inclination sensor 56, and a control unit 50 into which signals from the beam selection switch 52, the leftward inclination sensor 54 and the rightward inclination sensor 56 are input. The control unit 50 is operable to control the lighting of the respective lamp units 30C, 30L, 30R, 40L1, 40R1, 40L2, 40R2.

The beam selection switch 52 is provided for selectively switching the low beam and the high beam. The leftward inclination sensor 54 detects that the body of the two-wheel vehicle equipped with the headlamp 10 is inclined leftward at a threshold angle (e.g., about 10°) or more, and the rightward inclination sensor 56 detects that the body is inclined rightward at the threshold angle or more. The leftward inclination sensor 54 and the rightward inclination sensor 56 may be ultrasonic sensors.

The control unit 50 is operable to switch a beam to be irradiated from the headlamp 10 in accordance with an input signal from the beam selection switch 52. The control unit 50 is further operable, in accordance with an input signal from the leftward inclination signal 54 or the rightward inclination signal 56, to execute a control for the light-volume-reduced additional lighting which will be described below.

If the body of the two-wheel vehicle is inclined leftward at the threshold angle or more while traveling with the low beam being selected (i.e., with only the lamp units 30C, 30L, 30R being turned on), the control unit 50 turns on the lamp unit 40L1 in addition to the lamp units 30C, 30L, 30R, in accordance with a detection signal input from the leftward inclination sensor 54, with the luminous intensity of the lamp unit 40L1 being reduced. On the other hand, if the body of the two-wheel vehicle is inclined rightward at the threshold angle or more while traveling with the low beam being selected, the control unit 50 turns on the lamp unit 40LR in addition to the lamp units 30C, 30L, 30R, in accordance with a detection signal input from the leftward inclination sensor 56, with the luminous intensity of the lamp unit 40R1 being reduced.

The headlamp further includes a dimmer circuit 58 (dimmer means) operable to dim the lamp unit 40L1 and a dimmer circuit 60 (dimmer means) operable to dim the lamp unit 40R1, which are coupled to the control unit 50.

Figure 4A:
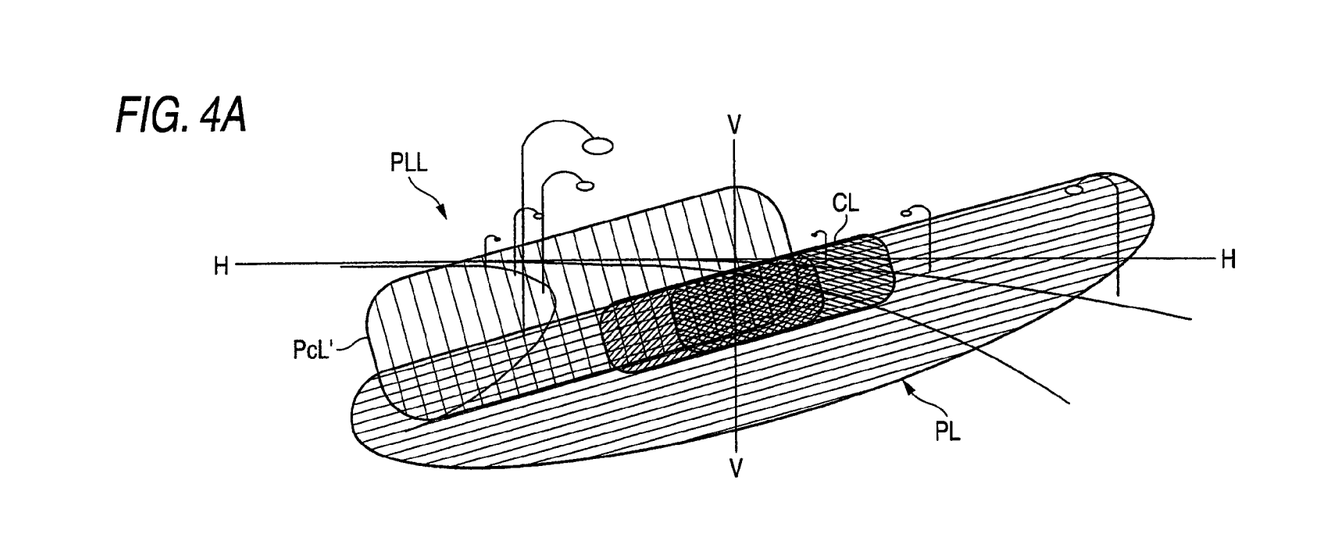
FIGS. 4A and 4B are perspective views showing another low-beam light distribution pattern formed on the imaginary vertical screen when a body having the headlamp according to the first exemplary embodiment is turning leftward and rightward, respectively.
Figure 4B:
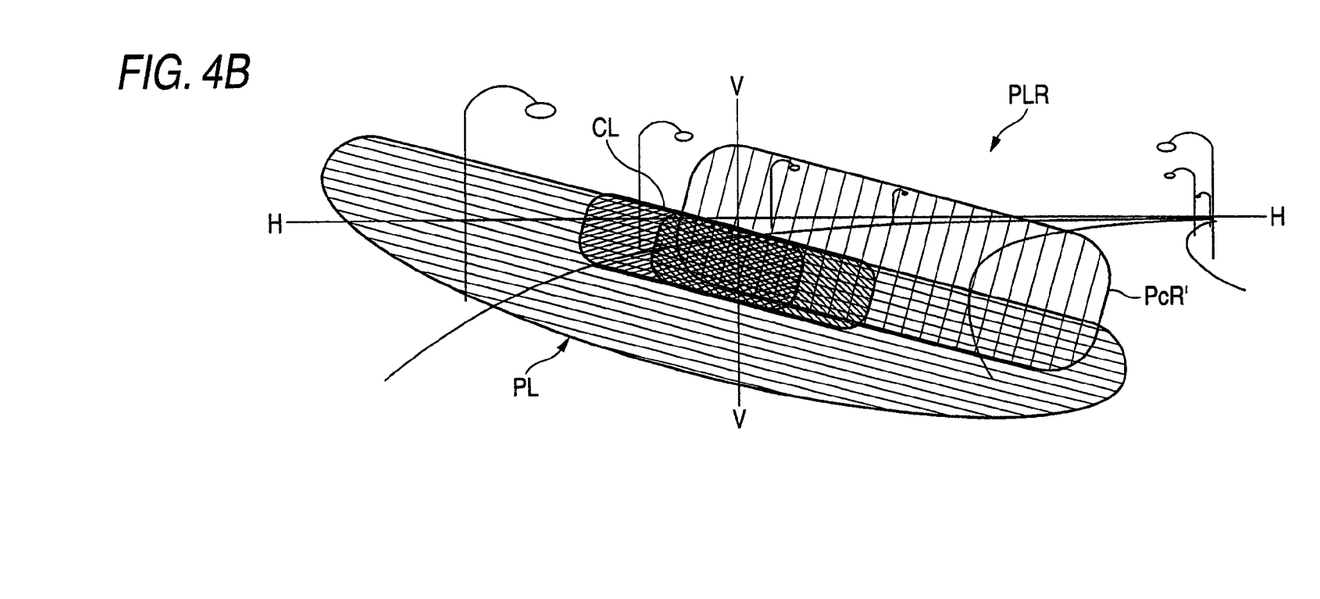

FIG. 4A is a perspective view showing a low-beam light distribution pattern PLL formed on the imaginary vertical screen when the two-wheel vehicle having the headlamp 10 is turning leftward, while FIG. 4B is a perspective view showing another low-beam light distribution pattern PLR formed on the imaginary vertical screen when the two-wheel vehicle having the headlamp 10 is turning rightward.

As shown in FIG. 4A, the low-beam light distribution pattern PLL, which is formed when the two-wheel vehicle is turning leftward, is formed by adding a light distribution pattern PcL' to the low-beam light distribution pattern PL inclined leftward by an amount equal to a bank angle of the body of the two-wheel vehicle. The light distribution pattern PcL' is formed by reducing the luminous intensity of the left side diffused light distribution pattern PcL of the high-beam light distribution pattern PH, and overlaps with the horizontal cut-off line CL of the low-beam light distribution pattern PL.

Due to the additionally formed light distribution pattern PcL', a road surface ahead of the two-wheel vehicle in a cornering direction, i.e., an area deviated above the horizontal cut-off line CL as a result of the inclination of the low-beam light distribution pattern PL, is prevented from being totally dark, and is irradiated with a certain degree of brightness. Thus, a forward visibility of a rider of the two-wheel vehicle is ensured.

As shown in FIG. 4B, the low-beam light distribution pattern PLR, which is formed when the two-wheel vehicle is turning rightward, is formed by adding a light distribution pattern PcR' to the low-beam light distribution pattern PL inclined rightward by an amount equal to a bank angle of the body of the two-wheel vehicle. The light distribution pattern PcR' is formed by reducing the luminous intensity of the right side diffused light distribution pattern PcR of the high-beam light distribution pattern PH, and overlaps with the horizontal cut-off line CL of the low-beam light distribution pattern PL.

Due to the additionally formed light distribution pattern PcR', a road surface ahead of the two-wheel vehicle in a cornering direction, i.e., an area deviated above the horizontal cut-off line CL as a result of the inclination of the low-beam light distribution pattern PL, is prevented from being totally dark, and is irradiated with a certain degree of brightness. Thus, a forward visibility of the rider of the two-wheel vehicle is ensured.

As described above, the headlamp 10 is configured such that the low beam and the high beam are selectable. If the low beam is selected, only the lamp units 30C, 30L, 30R of the first lamp section are turned on to form the low-beam light distribution pattern PL. If the high beam is selected, the lamp units 40L1, 40R1, 40L2, 40R2 of the second lamp section are turned on to form the high-beam light distribution pattern PH. If the body of the two-wheel vehicle equipped with the headlamp 10 is inclined leftward or rightward at the certain angle or more while the two-wheel vehicle traveling with the low beam being selected, the control unit 50 additionally turns on the lamp unit 40L1 or the lamp unit 40R1 with the luminous intensity thereof being reduced. Therefore, the light distribution pattern PcL' or the light distribution pattern PcR', which is formed by reducing the luminous intensity of the diffused light distribution pattern PcL or the diffused light distribution pattern PcR of the high-beam light distribution pattern PH, can be added to the normal low-beam light distribution pattern PL. As a result, even if the body of the two-wheel vehicle is largely inclined leftward or rightward due to a cornering operation of the two-wheel vehicle, a road surface ahead of the two-wheel vehicle in a cornering direction can be irradiated sufficiently.

Further, the above described advantages can be obtained by a simple configuration in which a lighting control is performed with respect to the lamp units, without providing any mechanism for inclining the lamp body.

According to the first exemplary embodiment, a road surface ahead of the two-wheel vehicle in a cornering direction can be irradiated sufficiently while a cornering operation of the two-wheel vehicle with the low beam being selected. Thus, it is possible to improve the forward visibility of the rider of the two-wheel vehicle.

Further, according to the first exemplary embodiment, the second lamp section includes the converging lamp units 40L2, 40R2 which irradiate light to form the converged light distribution patterns, and the diffusing lamp units 40L1, 40R1 which irradiate light to form the diffused light distribution patterns which is diffused in the horizontal direction. The lamp unit 40L1 forwardly irradiates the light toward the left of the body of the two-wheel vehicle, and the lamp unit 40L2 forwardly irradiates the light toward the right of the body of the two-wheel vehicle. Consequently, the control unit 50 can switch between the normal low-beam light distribution pattern PL and the low-beam light distribution patterns PLL, PLR, which are formed during a cornering operation of the two-wheel vehicle, through a simple control, that is, turning on the lamp unit 40L1 when the body of the two-wheel vehicle is inclined leftward, and turning on the lamp unit 40R1 when the body is inclined rightward. In this way, the lamp units which are suitable for forming a light distribution pattern advantageous to ensure the forward visibility in a cornering operation of the two-wheel vehicle are turned on. Therefore, it is possible to avoid giving unnecessary glare to oncoming drivers or riders with a low power consumption.

Further, according to the first exemplary embodiment, the dimmer circuits 58, 60 are provided to the control unit 50 for dimming the lamp units 40L1, 40R1, and the light-volume-reduced additional lighting of the lamp units 40L1, 40R1 is implemented through the dimmer circuits 58, 60. Thus, a road surface ahead of the two-wheel vehicle in a cornering direction can be irradiated with an optimum brightness by adjusting a degree of dimming. Accordingly, the forward visibility of the rider of the two-wheel vehicle can be ensured without giving a harmful glare to oncoming drivers or riders.

Further, according to the first exemplary embodiment, light sources of the respective lamp units 30C, 30L, 30R, 40L1, 40R1, 40L2, 40R2 are the light emitting elements 32. Therefore, it is possible to obtain a high response speed when turning on and off the lamp units. Accordingly, the light-volume-reduced additional lighting of the lamp units 40L1, 40R1 can be smoothly executed. Moreover, light volume can easily be adjusted by controlling an electric current. Thus, it is possible to simplify the configurations of the dimmer circuits 58, 60. Furthermore, the second lamp section can include many lamp units, thereby enabling a precise light distribution control like the first exemplary embodiment.

Second Exemplary Embodiment

Next, a second exemplary embodiment of the present invention will be described.

While the second lamp section of the first exemplary embodiment includes the four lamp units 40L1, 40R1, 40L2, 40R2, a second lamp section according to the second exemplary embodiment includes one converging lamp unit and one diffusing lamp unit.

Figure 5A:
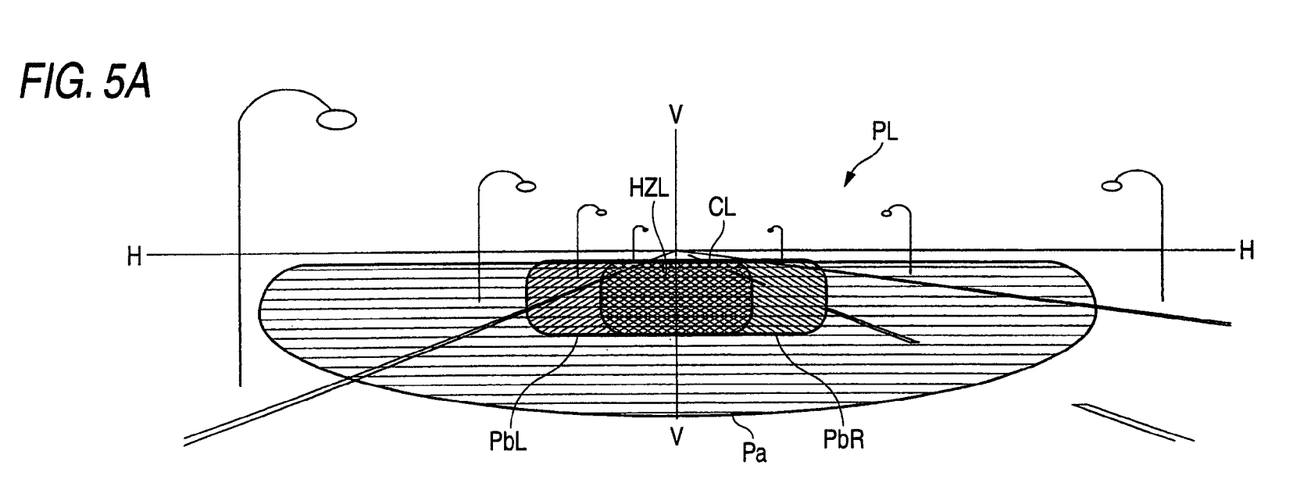
FIGS. 5A and 5B are perspective views showing a low-beam light distribution pattern and a high-beam light distribution pattern, respectively, formed on the imaginary screen, of a headlamp according to a second exemplary embodiment of the present invention.
Figure 5B:
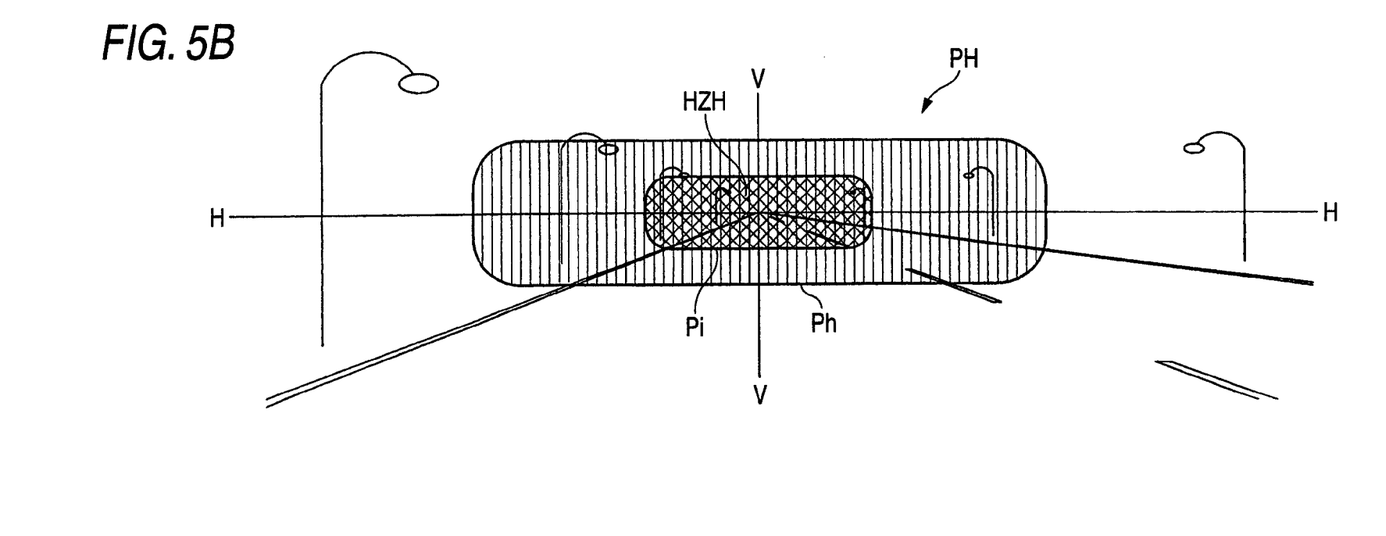

According to the configuration of the second exemplary embodiment, a high beam pattern PH is formed by combining one diffused light distribution pattern Ph and one converged light distribution pattern Pi overlapping with the diffused light distribution pattern Ph, as shown in FIG. 5B.

Figure 6A:
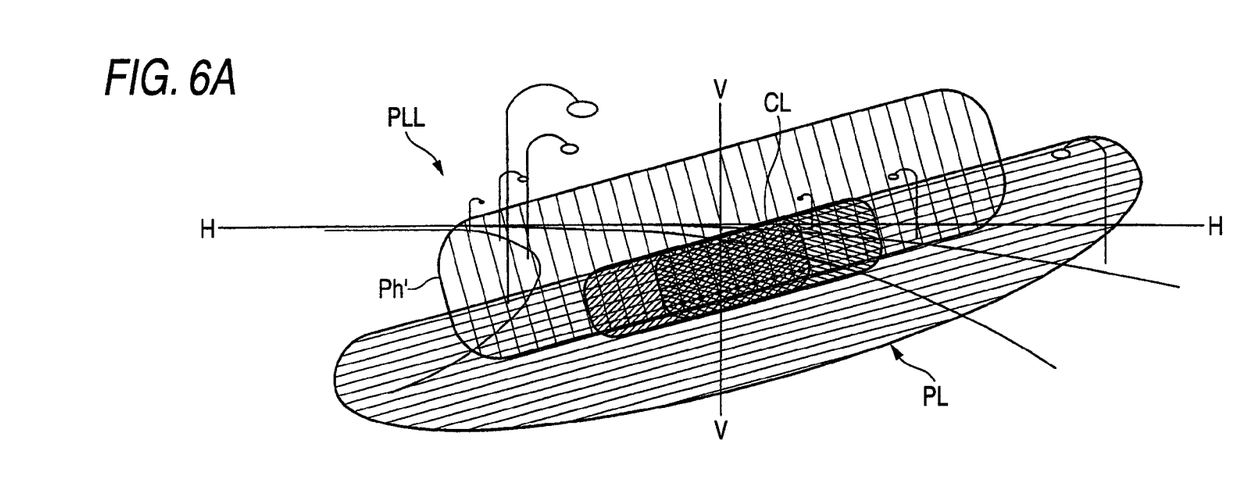
FIGS. 6A and 6B are perspective views showing another low-beam light distribution pattern formed on the imaginary vertical screen when a body having the headlamp according to the second exemplary embodiment is turning leftward and rightward, respectively.
Figure 6B:
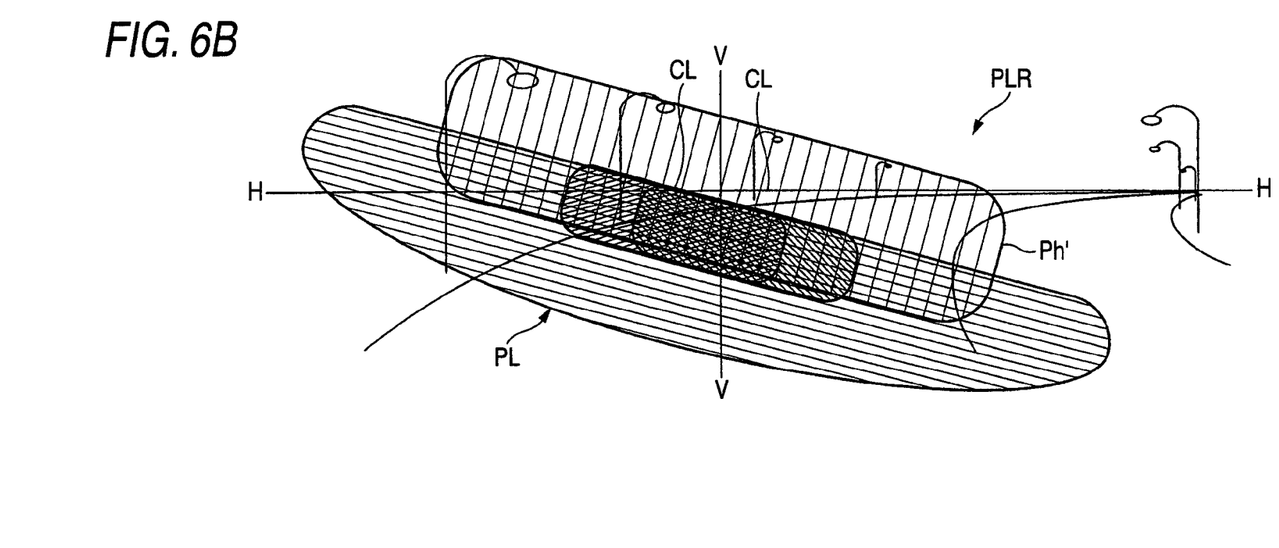

As shown in FIG. 6A, a low-beam light distribution pattern PLL, which is formed when a two-wheel vehicle is turning in the leftward direction, is formed by adding a light distribution pattern Ph' to a low-beam light distribution pattern PL that is inclined leftward by an amount equal to a bank angle of a body of the two-wheel vehicle. As shown in FIG. 6B, a low-beam light distribution pattern PLR, which is formed when the two-wheel vehicle is turning in the rightward direction, is formed by adding a light distribution pattern Ph' to the low-beam light distribution pattern PL that is inclined rightward by an amount equal to a bank angle of a body of the two-wheel vehicle. The light distribution pattern Ph' is formed by reducing a luminous intensity of the diffused light distribution pattern Ph, and extends evenly on respective sides of a horizontal cut-off line CL of the low-beam light distribution pattern PL to overlap with the horizontal cut-off line CL.

According to the configuration of the second exemplary embodiment, even if the second lamp section includes only two lamp units, a road surface ahead of the two-wheel vehicle in a cornering direction can be irradiated sufficiently like the first exemplary embodiment without a complicated lamp configuration.

Third Exemplary Embodiment

According to a third exemplary embodiment of the present invention, a second lamp section includes a single lamp unit.

Figure 7A:
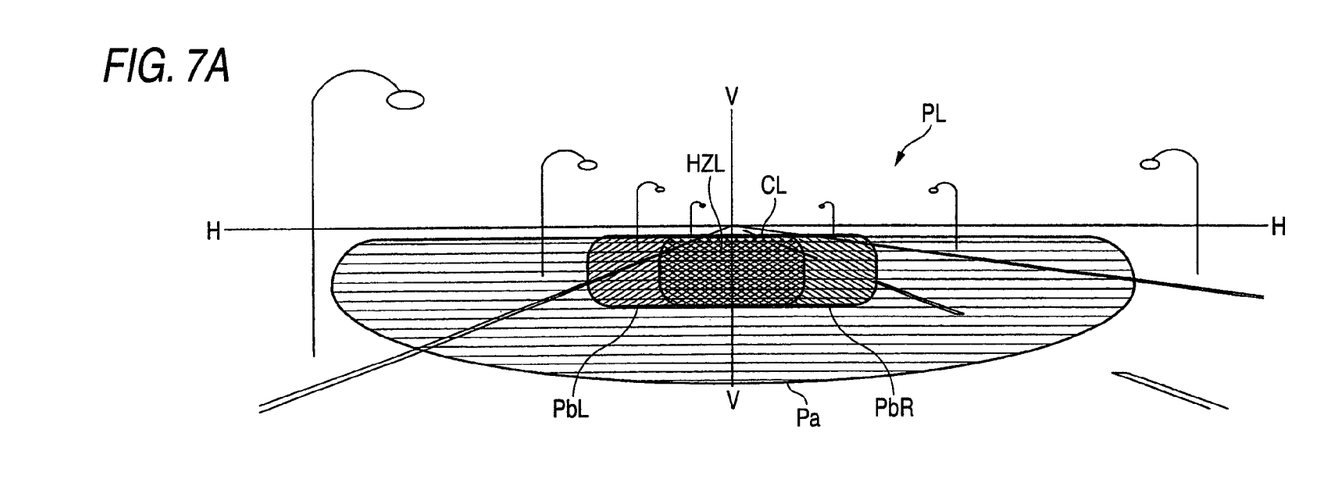
FIGS. 7A and 7B are perspective views showing a low-beam light distribution pattern and a high-beam light distribution pattern, respectively, formed on the imaginary screen, of a headlamp according to a third exemplary embodiment of the present invention.
Figure 7B:
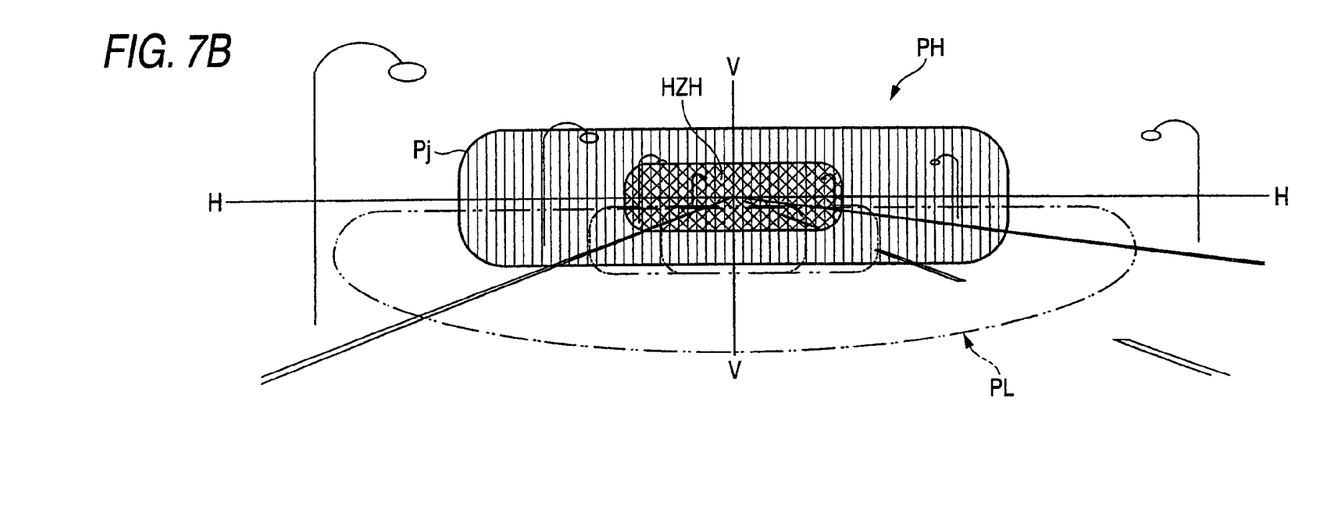
Figure 8A:
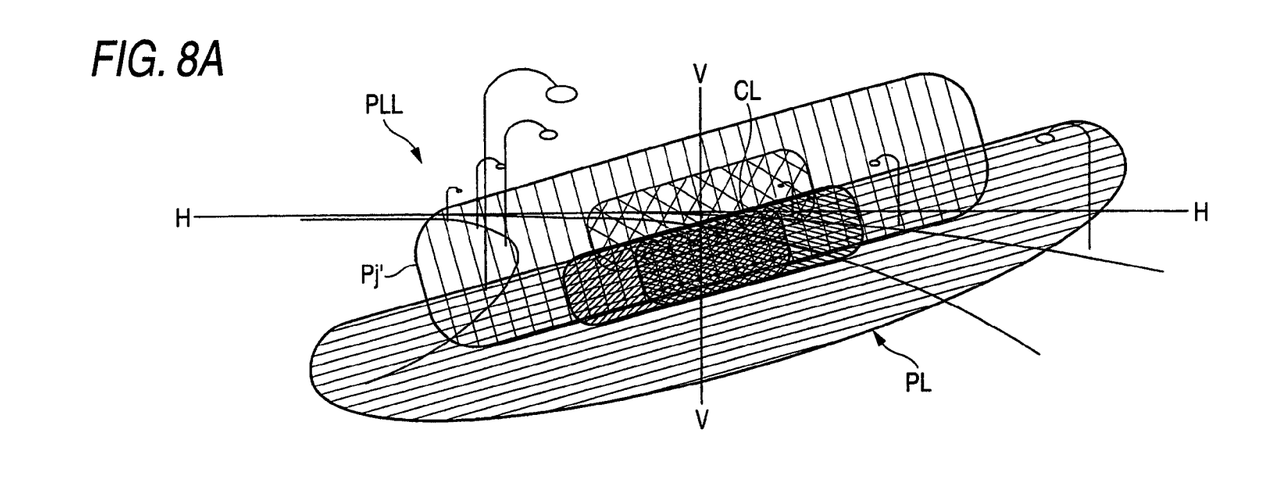
FIGS. 8A and 8B are perspective views showing another low-beam light distribution pattern formed on the imaginary vertical screen when a body having the headlamp according to the third exemplary embodiment is turning leftward and rightward, respectively.
Figure 8B:
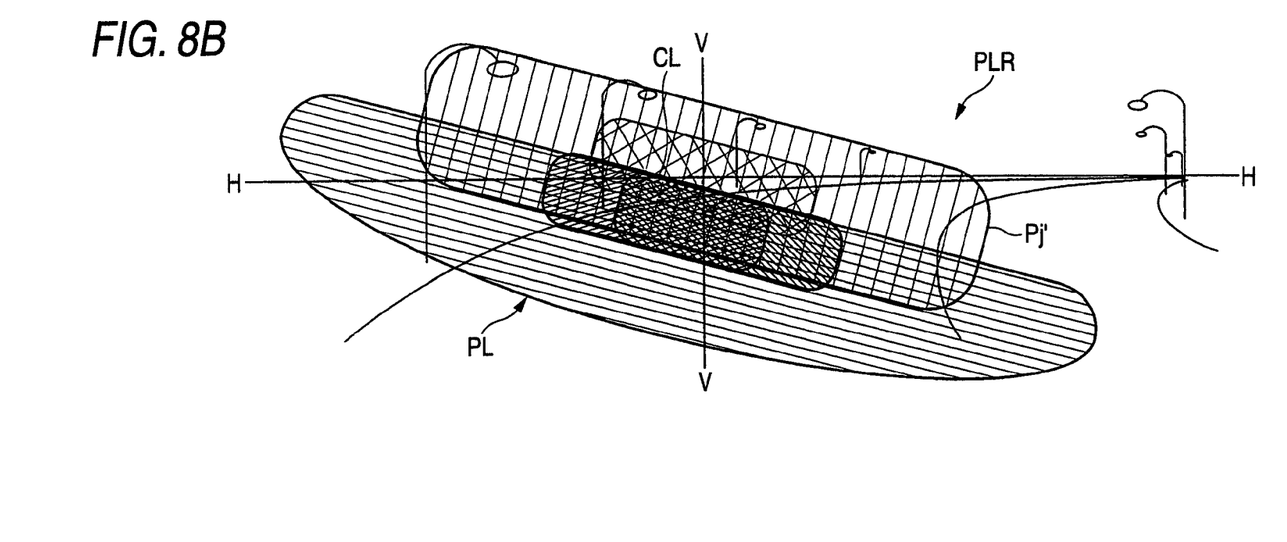

According to the configuration of the third exemplary embodiment, a high beam pattern PH is formed by a single light distribution pattern Pj as shown in FIG. 7B. As shown in FIG. 8A, a low-beam light distribution pattern PLL, which is formed when a two-wheel vehicle is turning in the leftward direction, is formed by adding a light distribution pattern Pj' to a low-beam light distribution pattern PL that is inclined leftward by an amount equal to a bank angle of a body of the two-wheel vehicle. As shown in FIG. 8B, a low-beam light distribution pattern PLR, which is formed when the two-wheel vehicle is turning in the rightward direction, is formed by adding the light distribution pattern Pj' to the low beam light distribution pattern PL that is inclined rightward by an amount equal to a bank angle of the body of the two-wheel vehicle. The light distribution pattern Pj' is formed by reducing a luminous intensity of the light distribution pattern Pj, and extends evenly on respective sides of a horizontal cut-off line CL of the low-beam light distribution pattern PL to overlap with the horizontal cut-off line CL.

According to the configuration of the third exemplary embodiment, even if the second lamp section includes only a single lamp unit, a road surface ahead of the two-wheel vehicle in a cornering direction can be irradiated sufficiently like the first exemplary embodiment without a complicated lamp configuration.

In a case in which the second lamp section includes only a single lamp unit, since it may be difficult to provide a sufficient brightness for the high-beam light distribution pattern PH. Therefore, three lamp units 30C, 30L, 30R or two lamp units 30L, 30R of the first lamp section may be turned on also when the high beam is selected so that the low-beam light distribution pattern PL (shown in a chain double-dashed line in FIG. 7B) or the light distribution patterns PbL, PbR partially overlap with the high-beam light distribution pattern PH, thereby ensuring sufficient brightness for the high-beam light distribution pattern PH.

According to the above exemplary embodiments, an additional lighting of the second lamp section or a part of the second lamp section is performed while reducing luminous intensity thereof. For example, in the first exemplary embodiment, one of the lamp units 40L1, 40R1 is turned on in addition to the first lamp section with the luminous intensity of the lamp units 40L1, 40R1 being reduced through the dimmer circuits 58, 60, respectively. However, a part of the second lamp section may be additionally turned on without reducing the luminous intensity thereof.

Further, the first lamp section may have any configuration in so far as the low-beam light distribution pattern is formed by light irradiated from the first lamp section alone. The first lamp section may include one or more lamp units.

Further, the second lamp section may have any configuration in so far as the high-beam light distribution pattern is formed by light irradiated from the second lamp section alone or in combination with the light or part of the light irradiated from the first lamp section. The second lamp section may include one or more lamp units.

Further, a specific range of the threshold angle is not restricted. The threshold angle may be, for example, 5° to 15°.

Further, the control unit (lighting control means) may have any configuration in so far as the control unit turns on the second lamp section in addition to the first lamp section with the light volume of the second lamp section being reduced when the two-wheel vehicle is inclined leftward or rightward at a certain angle or more while the low beam is selected.

Further, in the above exemplary embodiments, each of the lamp units (e.g., the lamp units 30C, 30L, 30R, 40L1, 40R1, 40L2, 40R2 of the first exemplary embodiment) has been described as a reflection-type lamp units in which light from a light source (e.g., the light emitting element 32) is forwardly reflected by a reflector (e.g., the reflectors 34L, 34R, 44L1, 44R1, 44L2, 44R2. However, the present inventive concept is also applicable to a headlamp including a projector type lamp unit(s).

Further, in the above exemplary embodiments, the light source of each of the lamp units (e.g., the lamp units 30C, 30L, 30R, 40L1, 40R1, 40L2, 40R2 of the first exemplary embodiment) has been described as the light emitting element 32. However, the light source may be any light source such as a discharge bulb or a halogen bulb.

Lastly, in the above exemplary embodiments, the headlamp was described in relation to the example of a two-wheel vehicle. However, the present inventive concept applies equally to any lighting device used with a body that inclines.

While description has been made in connection with exemplary embodiments of the present invention, those skilled in the art will understand that various changes and modification may be made therein without departing from the present invention. For example, numerical values in the above description of the exemplary embodiments may, of course, be set to different values as is advantageous. It is aimed, therefore, to cover in the appended claims all such changes and modifications falling within the true spirit and scope of the present invention.

What is claimed is:

1. A headlamp provided on a vehicle body and configured such that a low beam and a high beam are selectable, the headlamp comprising:
   a first lamp section which forms a low-beam light distribution pattern if the low beam is selected;
   a second lamp section which forms a high-beam light distribution pattern if the high beam is selected; and
   a control unit which turns on the second lamp section at a reduced light volume if the inclination angle of the vehicle body is detected to be equal to or greater than a threshold angle while the low beam is selected and the high beam is not selected, the second lamp section forming at least a portion of the high-beam light distribution pattern in addition to the low-beam light distribution pattern, said portion including a region above the low-beam light distribution pattern;

wherein the reduced light volume is less than a standard light volume provided by the second lamp section.

2. The headlamp according to claim 1, further comprising a dimmer circuit operable to adjust the light volume of the second lamp section, wherein the control unit controls the dimmer circuit to produce the reduced light volume.

3. The headlamp according to claim 1, wherein the second lamp section comprises:

a converging lamp unit which forms a converged light distribution pattern; and a diffusing lamp unit which forms a diffused light distribution pattern, wherein the control unit turns on the second lamp section at the reduced light volume by turning on the diffusing lamp unit without turning on the converging lamp unit.

4. The headlamp according to claim 3, wherein the diffusing lamp unit comprises:

a left-forward irradiating lamp unit which forwardly irradiates a light in a leftward direction of the vehicle body; and a right-forward irradiating lamp unit which forwardly irradiates a light in a rightward direction of the vehicle body, wherein, if the vehicle body is inclined leftward at an inclination angle that is equal to or greater than the threshold angle while the low beam is selected, the control unit turns on the second lamp section at the reduced light volume by turning on the left-forward irradiating lamp without turning on the right-forward irradiating lamp, and wherein, if the vehicle body is inclined rightward at an inclination angle that is equal to or greater than the threshold angle while the low beam is selected, the control unit turns on the second lamp section at the reduced light volume by turning on the right-forward irradiating lamp without turning on the left-forward irradiating lamp.

5. The headlamp according to claim 1, further comprising a beam selection switch for selecting the low beam or the high beam, wherein the control unit turns on the first lamp section if the low beam is selected, and wherein the control unit turns on the second lamp section if the high beam is selected.

6. The headlamp according to claim 1, further comprising a sensor which detects the inclination angle at which the vehicle body is inclined and, if the inclination angle is equal to or greater than the threshold angle, outputs a detection signal to the control unit, wherein, if the control unit receives the detection signal from the sensor while the low beam is selected, the control unit turns on the second lamp section at a reduced light volume.

7. The headlamp according to claim 1, further comprising:
a lamp body having an opening portion, and
a transparent cover attached to the opening portion of the lamp body to form a lamp chamber,
wherein the first lamp section and the second lamp section are accommodated inside the lamp chamber.

8. The headlamp according to claim 7, further comprising a metallic bracket supported by the lamp body,
wherein the first lamp section and the second lamp section are fixedly supported by the metallic bracket.

9. The headlamp according to claim 1, wherein the second lamp section comprises a light emitting element.

10. The headlamp according to claim 1, wherein the control unit turns on the second lamp section at the standard light volume if the inclination angle of the vehicle body is detected to be equal to or greater than the threshold angle while the low beam is not selected and the high beam is selected.

11. A headlamp provided on a vehicle body and configured such that a low beam and a high beam are selectable, the headlamp comprising:

a first lamp section which forms a low-beam light distribution pattern if the low beam is selected;

a second lamp section which forms a high-beam light distribution pattern if the high beam is selected; and a control unit which turns on the second lamp section at a reduced light volume if the inclination angle of the vehicle body is detected to be equal to or greater than a threshold angle while the low beam is selected;

wherein the reduced light volume is less than a standard light volume provided by the second lamp section;

wherein the control unit turns on the second lamp section at the reduced light volume when the high beam is not selected, wherein the second lamp section comprises:

a left-forward irradiating lamp unit which forwardly irradiates a light in a leftward direction of the vehicle body; and a right-forward irradiating lamp unit which forwardly irradiates a light in a rightward direction of the vehicle body, wherein, if the vehicle body is inclined leftward at an inclination angle that is equal to or greater than the threshold angle while the low beam is selected, the control unit turns on the second lamp section at the reduced light volume by turning on the left-forward irradiating lamp without turning on the right-forward irradiating lamp, and wherein, if the vehicle body is inclined rightward at an inclination angle that is equal to or greater than the threshold angle while the low beam is selected, the control unit turns on the second lamp section at the reduced light volume by turning on the right-forward irradiating lamp without turning on the left-forward irradiating lamp.

12. A two wheeled vehicle, comprising:
a vehicle body; and
a headlamp, the headlamp being configured such that a low beam and a high beam are selectable, the headlamp comprising:
a low-beam lamp section which forms a low-beam light distribution pattern if the low beam is selected;
a high-beam lamp section which forms a high-beam light distribution pattern if the high beam is selected, the high-beam lamp section comprising
a converging lamp unit which forms a converged light distribution pattern; and
a diffusing lamp unit which forms a diffused light distribution pattern;
a sensor which detects an inclination angle at which the vehicle body of the two wheeled vehicle is inclined and, if the inclination angle is equal to or greater than the threshold angle, outputs a detection signal; and
a control unit which, if the sensor outputs a detection signal while the low beam is selected, turns on the high-beam lamp section at a reduced light volume by turning on the diffusing lamp unit without turning on the converging lamp unit;

wherein the reduced light volume is less than a standard light volume provided by the high-beam lamp section;

wherein the control unit turns on the high-beam lamp section at the reduced light volume when the high beam is not selected.

13. The two-wheeled vehicle according to claim 12, wherein the diffusing lamp unit comprises:
- a left-forward irradiating lamp unit which forwardly irradiates a light in a leftward direction of the two wheeled vehicle; and
- a right-forward irradiating lamp unit which forwardly irradiates a light in a rightward direction of the two wheeled vehicle, wherein the sensor further senses whether the two wheeled vehicle is inclined leftward or rightward at the inclination angle, and wherein, if the two wheeled vehicle is inclined leftward at an inclination angle that is equal to or greater than the threshold angle while the low beam is selected, the control unit turns on the second lamp section at the reduced light volume by turning on the left-forward irradiating lamp without turning on the right-forward irradiating lamp, and wherein, if the two wheeled vehicle is inclined rightward at an inclination angle that is equal to or greater than the threshold angle while the low beam is selected, the control unit turns on the second lamp section at the reduced light volume by turning on the right-forward irradiating lamp without turning on the left-forward irradiating lamp.

14. The headlamp according to claim 12, wherein the high-beam light distribution pattern includes a region above the low-beam light distribution pattern.

* * * * *